Patented Apr. 24, 1934

1,956,053

UNITED STATES PATENT OFFICE 1,956,053

RUBBER-BONDED ASBESTOS PRODUCT AND METHOD OF MAKING

George R. Tucker, North Andover, Mass., assignor to Dewey and Almy Chemical Company, North Cambridge, Mass., a corporation of Massachusetts No Drawing. Application April 17, 1931, Serial No. 530,997

10 Claims. (Cl. 92—21)

This invention relates to a method of making rubber-bonded asbestos products; and it comprises the treatment of asbestos, suspended in a watery medium, with an aqueous dispersion of electropositive colloidal rubber particles not susceptible of static coagulative clotting y the action of said asbestos in said watery medium but capable of spontaneous consociation with said asbestos; and it further comprises the thorough intermixing of the dispersions of said asbestos and said rubber, preferably in the presence of an asbestos dispersing agent; permitting said spontaneous consociation to take place, preferably without diminution of the dispersion of the asbestos, whereby a watery suspension, and preferably a dispersion, of said asbestos and attachedly consociated rubber particles of colloidal dimensions are obtained; all as hereinafter more fully described and claimed.

Asbestos treated according to the method of the invention may be advantageously utilized in the fabrication of such rubber-asbestos products as asbestos paper, gasket and friction material, asbestos board and insulating panels, brake lining, brake blocks, and the like.

One object of the invention is to provide a simpler, cheaper, and more easily regulable process than any heretofore known for effecting a consociation of asbestos and uniformly disposed rubber particles of colloidal dimensions. Another object is to provide asbestos and attachedly consociated rubber particles of colloidal dimensions in a state of greater dispersion than has heretofore been possible whereby products of great homogeneity may be obtained. Other objects and advantages of the invention will become apparent from its more detailed description.

Sundry processes have heretofore been suggested for the treatment of fibers generally with rubber dispersions but the behavior of asbestos is anomalous and these prior processes are not generally applicable thereto. The behavior of animal and vegetable fibers in most fiber treatment processes is similar while the behavior of asbestos differs therefrom and is, as stated, anomalous. Thus, for examples; animal and vegetable fibers are generally receptive of direct dyestuffs while asbestos is not; animal and vegetable fibers are not coagulative of ordinary rubber latex while asbestos is strongly coagulative of it; animal and vegetable fibers swell or become hydrated when subjected to beating according to usual paper-making procedures while asbestos is chemically inert to such treatment; animal and vegetable fibers are not particularly responsive to the action of certain agents, later to be herein described, while such agents are tremendously effective to disperse asbestos suspended in water; etc.

These differences in behavior between animal and vegetable fibers and asbestos are due to inherent differences in physical and chemical structure. Thus, animal and vegetable fibers are of colloidal and amorphous structure while asbestos is crystalline; animal and vegetable fibers are believed to assume a negative electrical charge when immersed in water while asbestos conversely is believed to assume a positive electrical charge; the individual fiber units of animal and vegetable fibers are determinate and similar in size while asbestos is capable of being longitudinally subdivided and re-subdivided almost without limit to produce new fibrous crystals or crystalline bundles of nearly any assigned latitudinal dimension; and while a slurry of animal or vegetable fibers is composed of fibers that are all comparable in diameter with one another, a suspension or slurry of asbestos may be composed of clustered aggregates of the fine elongate crystals, which clusters may vary in cross section all the way from microscopic to macroscopic dimensions. All these differences impart to asbestos an anomalous behavior in most fiber treatment processes; and the treatment of asbestos with aqueous rubber dispersions is no exception.

Thus, if ordinary commercial rubber latex be stirred into a suspension or slurry of organic fiber in water, the fibers remain suspended in a substantially unchanged condition in the aqueous medium while the bath is rendered turbid by the presence of the colloidal rubber particles dispersed therein. The latex exhibits no tendency towards a material alteration of the state of fiber dispersion nor do the rubber particles thereof tend to become attachedly consociated with the fibers of the slurry; but if such latex be stirred into a suspension of asbestos and water, however, there is first observed a marked diminution of the extent of the dispersion of the asbestos followed, if there be a sufficiency of latex, by an appearance of decided "stringiness" which tends toward the formation of tough, coherent asbestos-rubber masses. An inspection of such masses discloses the fact that the rubber has become coagulated and that the asbestos is coherently attached to and entangled with the rubber coagulum. Such masses of coagulatively clotted rubber and asbestos are useless for paper-making and similar processes.

Although asbestos is generally spoken of as being insoluble in water, experience has shown that there is inherent in or associated with both the amphibole and serpentine asbestos some water-soluble material. This material in solution possesses the property of coagulating commercial rubber latex. Whether the coagulating effect of asbestos on ordinary latex is entirely due to the soluble material or not is not known to me; but when such coagulation takes place in the presence of asbestos, there are formed clots or masses composed of coagulated rubber and entrained asbestos which tend to become further welded together and are useless as a material for the purposes to which the product of the process of this invention is directed.

The anomalous and disadvantageous behavior of asbestos when treated with ordinary commercial rubber latex is in part occasioned by some coagulative property of the asbestos, as stated, and has been more or less overcome in prior processes by the joint use of a protective agent and a subsequently controlled coagulant.

This protective agent performed the two-fold function of protecting the latex against the coagulative reaction of the asbestos and of facilitating and preserving the dissemination and dispersion of the asbestos throughout the aqueous medium at least during the admixture of the latex. The function of the coagulant was to coagulate the individual rubber particles into small integral coagula large enough to be enmeshed by the asbestos without at the same time permitting the formation of undesirable clots or lumps or the inseparable asbestos-rubber masses inevitably produced in the absence of protective. More concretely stated, asbestos has heretofore been suspended in water, and to this slurry was added the desired quantity of commercial rubber latex containing a small amount of a suitable protective agent, such as a protein, sulfonated oils, or the like. Due to the presence of the protective agent the coagulative clotting influence of the asbestos was neutralized and inhibited; and the rubber particles and the asbestos each maintained individual, separate, spaced existence in the watery medium. When the coagulant, for example paper maker's alum, was subsequently added, in such amount as to just overcome the effect of the protective, the rubber particles were coagulated into small coagula without, however, producing large clots and these coagula became entangled with the asbestos and held thereby while the now combined asbestos and rubber coagula retained a sufficient, albeit greatly reduced, dispersion to permit of fair assembly according to well-known felting, sheeting, or paper-making processes.

Such processes, however, have always been attended with serious disadvantages and these have militated against their more general adoption. Thus, the successful operation and control of such processes demand the exercise of greater care and skill than can be generally practiced in the art of treating furnishes and similar slurries. Even when such care and skill is applied there is still much left to be desired, particularly because of the decidedly poor felting resulting from the lowering of the asbestos dispersion by the coagulant. Careful study has demonstrated that the true function of the coagulant, in such a process, is to coagulate the latex particles into unit coagula of such size that they will be mechanically caught and entrapped in and by the disseminated asbestos. The characteristics of the finished product, however, are largely dependent on two factors: the size of the rubber coagula which are thus entrapped and held; and the degree of the asbestos dispersion, i. e. the completeness with which the naturally occurring fibrous crystals are opened up and spaced apart. If the entrained rubber coagula be large, the product lacks uniformity and rubber continuity; while if the asbestos dispersion be poor, that is if the asbestos is allowed to remain matted or become "stringy" before the final assembly, the resultant product will lack homogeneity, strength, and density. The ultimate aim is, therefore, to maintain a maximum asbestos dispersion with the formation and entanglement of the smallest rubber coagula that can be entrained thereby and extracted from the aqueous medium together with the asbestos. But this aim is never fully accomplished by prior methods because the coagulative agent inherently and inevitably exercises a matting and entwining influence upon the dispersed asbestos as well as upon the rubber latex particles. The protective agent may tend to minimize the detrimental flocculative (matting and entwining) influence of the coagulative agent upon the dispersed asbestos while the less resistant latex particles are suitably coagulated; but its use is only a compromise at best. The very necessary activity of the coagulative agent in one direction tends to defeat the object of the process in another direction and is therefore inimical to excellence of asbestos dispersion; and superiority of the final product is sacrificed.

Nor are these the only disadvantages of the process. For many purposes the nature and character of the coagulative agent is objectionable. It may exercise a detrimental influence upon the aging qualities of the finished product; or it may cause a low dielectric strength and preclude the possibility of using the finished product for electrical insulating purposes. In other cases either the protective or the coagulative agent, or even the natural soluble constituents and protein or protective of the latex or rubber dispersion, may cause an objectionable water absorptivity of the finished article.

I have discovered that if, instead of employing ordinary commercial latex such as ammonia-preserved Hevea latex, the rubber particles of which carry a negative electrical charge, I add to a water suspension of asbestos an aqueous dispersion of rubber the colloidal particles of which carry, on the contrary, a positive electrical charge, no coagulative clotting takes place: the diffused uniformity of the asbestos dispersion is maintained and sometimes actually enhanced; but the turbidity due to the dispersed rubber disappears and the asbestos and rubber undergo a spontaneous consociation. Microscopic examination of so treated asbestos discloses the fact that the consociation involves some considerable degree of direct attachment of the rubber particles to the asbestos surfaces but does not apparently involve any coagulative clotting, as the consociated rubber particles, under the preferred mode of operation, are found to be of the same order of colloidal dimension as existed in the original dispersion of positively charged particles.

No theory is here advanced to account for the surprising asbestos-rubber consociation of my discovery; but I content myself with an observation of fact which, succinctly stated, is that electropositive colloidal rubber particles in mutual aqueous dispersion with asbestos become attached consociated with the asbestos without undergoing detectable coagulative clotting, under the preferred mode of operation, regardless of the charge imparted to the asbestos by its watery environment.

The expression "electropositive" and its converse "electronegative" are used herein to briefly distinguish solids which, under an impressed potential gradient in an electrolytic cell, migrate or tend to migrate electrophoretically towards the cathode or anode respectively.

Dispersions of positively charged colloidal rubber particles may be prepared from ordinary commercial latex by adding suitable agents thereto under proper conditions. Such agents are, inter alia, strong mineral acids or polyvalent metal salts. Preparative methods are already known in the art and form no part of the present invention. An example of such preparation will, however, later be more specifically described.

According to my invention, in its broadest embodiment, I suspend disseminated asbestos in a watery medium and add thereto an aqueous dispersion of positively charged colloidal rubber particles. The resultant slurry is agitated to uniformly distribute the dispersed rubber particles therethrough; whereupon the colloidal rubber particles and the asbestos spontaneously become attachedly consociated. The addition of the rubber dispersion to the asbestos slurry produces a turbidity therein due to the presence of the dispersed colloidal particles. This turbidity soon disappears and the remaining clear liquor evidences the consociation of the rubber particles and the asbestos. After the turbidity has disappeared, i. e., the watery medium has become clear, the consociated rubber-asbestos material may be utilized according to well-known asbestos molding, felting, sheeting or paper-making processes.

Unlike prior processes the process of my invention involves no coagulating agent. The particles of a positively charged aqueous rubber dispersion become attachedly consociated with asbestos suspended in an aqueous medium without the necessity of a coagulant. Moreover, the coherent matting of asbestos, as occurs with ordinary electronegative rubber dispersions, is avoided. Furthermore, in the prior processes, using coagulants, the rubber particles coagulatively agglomerate into relatively large coagula no longer colloidal in dimensions, i. e. incapable of the Brownian motion characteristic of colloidal particles dispersed in an aqueous medium, and exhibiting substantially no migrating tendency when under an impressed potential gradient in an electrolytic cell; whereas in the present process the consociation of asbestos and rubber does not depend on nor involve any change in the colloidal dimensions of the rubber particles, i. e. they become attachedly consociated with the asbestos, so far as can be ascertained by microscopic inspection, in the same state of individuality (that is, as individual globules or minute colloidal groups of globules) as existed in the rubber dispersion before admixture with the asbestos. This is of major advantage as it permits a more uniform distribution of rubber on the asbestos surfaces and, consequently, the fabrication of asbestos-rubber articles, and particularly those containing a minor amount of rubber, which possess properties superior to those produced by prior processes.

The asbestos-water slurry which is to be treated with the electropositive rubber dispersion may be prepared in a variety of ways. Thus, the asbestos may be merely suspended in water by stirring or agitating the mass in a suitable tank or it may be placed in a beating engine and the mass beaten according to usual paper-making procedure. If maximum benefit is to be derived from the inherent advantages of the invention, however, care should be taken to insure thorough dispersion of the asbestos. Simple mechanical agitation is effective for coarse asbestos but is tremendously facilitated and enhanced by the use of suitable dispersing agents, particularly with such finely divided asbestos as is usually desirable.

By the term "dispersion", as herein applied to asbestos, is meant that strikingly characteristic change in a water suspension of asbestos which occurs when an asbestos dispersing agent is added thereto and which may be identified by the following facts; there is a great increase in "slowness"; there is a marked increase in the apparent volume of the asbestos in the water; there is an unmistakable change in the "feel" of the asbestos as when compressed in the hand, that from an undispersed suspension tending readily to mat and that from a dispersion feeling unctuous and tending to slip through the fingers, i. e., the feel becomes "greasy" or "slimy"; and it is observed under the microscope that the traces of matting or stringiness, characteristic of asbestos merely suspended in water, are absent from a dispersed asbestos and that the fibrous crystals thereof present a delicate tracery or downyness as though they were under some mutually repulsive force.

I have discovered as part of this invention that certain amphoteric proteins, such as casein and hemoglobin when on the acid sides of their isoelectric points, and salts of polyvalent cations, especially those having monovalent anions, such for example as aluminum chloride and thorium nitrate, are not only capable of producing and/or protecting aqueous dispersions of positively charged particles of colloidal rubber but are compatible with and dispersive of asbestos when suspended in a watery medium. For the purpose of this invention the asbestos dispersing agent is usually so chosen as to serve both as protective for the rubber dispersion and disperser for the asbestos and is added preferably to the asbestos slurry as part of the rubber dispersion.

After the asbestos has been suitably opened up and suspended in water, it is ready to be treated with the electropositive rubber dispersion. At this point the consistency of the slurry should be sufficiently fluid to permit of ready and thorough mixing. Such will usually obtain with asbestos concentrations of from 5 to 15%. The electropositive rubber dispersion is then added to the agitated asbestos slurry and mixing continued until the dispersing liquor is visibly clear from rubber turbidity.

The electropositive rubber dispersion should be added to the asbestos slurry, preferably in dilute form. For most purposes a rubber concentration of about 5% is satisfactory. In order to obtain best results, the rubber dispersion should be added rather slowly to insure uniformity of rubber distribution. Sometimes it is expedient to spray the rubber dispersion into the agitated mass. This procedure is particularly applicable when the mixing is done in a beating engine, in which case the rubber dispersion may be sprayed into the beater immediately in front of the beater roll after the roll has been well raised from the bed plate. I have found that very satisfactory results are obtained if the dispersion be introduced at such a rate that the contents of the beater make at least twenty complete circuits of the beater while the dispersion is being added.

According to the present invention a quantity of rubber corresponding to as much as 50%, or more, of the weight of the asbestos may be attachedly consociated therewith. For most purposes, however, such as for the manufacture of brake lining or gasket material, about 20% to 25% of rubber will give best results. For some other purposes an even smaller percentage may be effective.

Aqueous dispersions of electropositive rubber may be prepared possessing widely different properties. These properties may be chosen, regulated, and adjusted to the requirements of the slurry. I generally prefer to use dispersions which are acid in reaction and/or possess comparatively high colloidal stability, although, under certain conditions, as when pigments or curative agents adversely affected by acid are present, it is sometimes desirable to use dispersions which are alkaline in reaction and/or possess relatively little colloidal stability. The acidity or alkalinity of the electropositive rubber dispersion is or may be adapted to and determined by the hydrogen ion concentration desired in the treated slurry, as is too well known and understood to require further description.

The colloidal stability of the electropositive rubber dispersion determines the rate at which the bath will clear when the dispersion is added, under otherwise like conditions, to the asbestos slurry. If the colloidal stability be high, the rate of clearing will be relatively slow; if the colloidal stability be low, however, the rate of clearing will be relatively rapid. A slow rate of clearing insures greater uniformity of rubber distribution. A high colloidal stability, but one which does not unduly prolong the operation, is therefore desirable.

The colloidal stability of an electropositive rubber dispersion may be enhanced by insuring the presence of certain suitable protective agents. These are generally known and are such as hemoglobin, serum albumen, acid proteins in general, polyvalent cations such as are derived from aluminum chloride and thorium nitrate, etc. The relative colloidal stabilities of electropositive rubber dispersions may be compared and measured by means of the mechanical agitation test commonly applied to ordinary rubber latex, or electronegative rubber dispersions.

When desired, the invention permits of the inclusion of fillers, compounding and pigmenting agents. These may be added either to the electropositive rubber dispersion or to the asbestos slurry prior to the addition of the rubber dispersion thereto. The latter procedure is usually more desirable and for this purpose best results will be obtained if the materials are added as a water suspension which has been previously ground, as in a paint or ball mill, to insure fineness of subdivision. Examples of suitable fillers, compounding and pigmenting agents are whiting, barytes, carbon black, iron oxide, sulfur, zinc oxide, graphite, finely divided metals such as lead, etc.

Detailed examples of the invention will more specifically illustrate the mode of operation.

*Example 1*

One thousand pounds of asbestos and 10,000 pounds of water are placed in an ordinary beating engine and the mixture beaten according to usual paper-making procedure. When the mass has been beaten to the required extent, the beater roll is raised and a pigment slurry added which contains

| | Pounds |
|---|---|
| Iron oxide | 100 |
| Carbon black | 6 |
| Sulfur | 40 |
| Zinc oxide | 20 |
| Phenyl beta-naphthylamine (antioxidant) | 1 |
| Diphenyl guanidine (accelerator) | 2 | and which has been previously prepared by mixing these ingredients with 200 pounds of water and passing the resulting mixture through an ordinary paint mill. The combined mass is agitated until the fillers, compounding and pigmenting agents have been uniformly distributed therethrough, whereupon it is ready to receive the electropositive rubber dispersion.

The electropositive rubber dispersion is prepared by diluting 600 pounds of a 35% ammonia-preserved commercial latex with 3600 pounds of water to which has been previously added 10 pounds of hemoglobin. To this mixture is then added with rapid stirring 90 pounds of commercial concentrated hydrochloric acid. The resulting electropositive colloidal rubber dispersion is then introduced into the beater immediately in front of the raised revolving beater roll, which serves thoroughly to distribute the particles of rubber throughout the bath. In order to insure a substantially uniform distribution of rubber the addition should be spread over a period of 10 to 20 minutes. This time interval has been found to be quite satisfactory when the contents of the beater make about two complete circuits per minute. When the mixing is more rapid, the dispersion may be added at a higher rate although the slower mixing is preferred. Mixing is continued for about 5 minutes after all of the dispersion has been added. The bath should then be substantially free from any rubber turbidity and from local concentrations of suspended fillers, compounding and pigmenting agents, and the stock is then ready to be utilized according to any of the well-known asbestos molding, felting, sheeting, or paper-making processes.

Alternative to the electropositive rubber dispersion employed in the previous example there may be used a dispersion similarly prepared but substituting an effectively equivalent amount of serum albumen, egg albumen, or any equally suitable amphoteric protein for hemoglobin. The protein functions not only to impart the desired degree of colloidal stability to the rubber dispersion but also to assist in dispersing the asbestos.

Good dispersion of the asbestos during the admixture of the rubber dispersion is required for uniformity of mutual distribution and should be maintained after the asbestos-rubber consociation has taken place if best utilization of the stock is to be made.

I have discovered, as part of this invention, that good dispersion of asbestos suspended in water may be obtained upon admixture of an electropositive rubber dispersion and maintained after the asbestos-rubber consociation has taken place without, however, having recourse to any added protein dispersing agent. This mode of operation, which I prefer, is illustrated by the following example:

Example 2

Six hundred pounds of a 35% ammonia-preserved commercial latex is diluted with 3600 pounds of water. To this diluted latex is then quickly added with rapid stirring a solution prepared by dissolving 54¼ pounds of commercial aluminum chloride crystals ($Al_2Cl_6 \cdot 12H_2O$) in 500 pounds of water. The resulting electropositive rubber dispersion may be used as above described. It will be noted that in this example no protein protective is used. Nevertheless, it will be found that the colloidal stability is satisfactorily high for good distribution but not so high as to prolong unduly the clearing of the bath.

The use of aluminum chloride for the preparation of positively charged rubber dispersions is, as stated, preferred, for the purposes of the present invention, to the more generally known procedures for charge reversal which employ a strong acid together with a supplementary protein or other protective agent. Rubber dispersions prepared with the aid of aluminum chloride are more stable and withstand storage longer than those prepared with the aid of a strong acid in conjunction with an added protein or other suitable protective agent. Moreover, the use of aluminum chloride obviates the use of an added protective and thereby permits the elimination of materials, such as proteins, which tend to increase water absorptivity in the ultimate product. Furthermore, the aluminum chloride plays a particularly advantageous part in that it both reverses the charge on the rubber particles and results in an excellent asbestos dispersion when subsequently admixed with a suspension thereof. While the proteins or other protective agents used to stabilize positively charged rubber dispersions are also effective for this purpose, as has been stated before, aluminum chloride is more efficacious. Thus, aluminum chloride may perform the threefold function of reversing the negative charge normally borne by rubber latex particles to positive, of imparting colloidal stability to the resulting positively charged rubber dispersion, and of advantageously facilitating and maintaining the dispersion of the asbestos throughout the subsequent treatment thereof.

Alternative to the preferred use of aluminum chloride there may be employed other salts, such as thorium nitrate, which provide polyvalent cations. Only those salts, however, which provide polyvalent cations and monovalent anions may be employed. Polyvalent anions are prejudicial to the stability of positively charged dispersions.

If the aqueous magmas of the previous examples be carefully observed throughout the progress of the process, it will be seen that the dispersion of the asbestos is accentuated by the addition of the electropositive rubber dispersion, i. e. the slurry becomes "slower" and the asbestos therein displays less tendency to settle in the dispersing liquor or to segregate as clumps or "islands" surrounded by the aqueous medium. This is desirable, as stated, and herein lies one of the inherent advantages of the invention over prior processes. The electropositive rubber and the asbestos not only become and remain consociated without diminution of the dispersion of the asbestos, but the process of consociation may, of itself, be effective to maintain, enhance or produce an advantageously excellent asbestos dispersion. This inherent property is believed to be due to the fact that those agents which are effective to produce and maintain the stability of an electropositive rubber dispersion are, under the conditions of the present invention, operative to maintain, enhance or produce excellency of asbestos dispersion, and, at the same time, do not inhibit the consociation of rubber and asbestos.

In contradistinction to this, those agents which in prior processes were essential to the stability of electronegative rubber dispersions and operative to facilitate excellency of fiber dispersion were antithetic to the reaction of the coagulant and the electronegative rubber upon which the entrainment of the rubber by the asbestos depended. Thus, before the asbestos could entrain and extract the rubber from the bath, it was necessary to remove, destroy, or overcome the effect of such agents as were protective of the colloidal rubber particles and dispersive of the asbestos. That was the function of the coagulant—to permit the entrainment of the rubber by the asbestos after overcoming, removing, or destroying instrumentalities essential to the maintenance of the individual integrity of both the colloidal rubber particles and the dispersed asbestos, i. e. by coagulation. And coagulation, however produced, is always accompanied by the agglomeration of colloidal particles into non-colloidal coagula and a flocculation of the asbestos. These agglomerative and flocculative effects, inimical to the objects but essential to the operativeness of prior processes, play no part in the present invention.

Admixture of the rubber dispersion and the asbestos slurry should be effected slowly to insure thorough mutual distribution, as stated, and stirring or agitation is usually required for the purpose; but such agitation should not be either so violent or long continued as to adversely affect the asbestos dispersion. For paper-making greater dilution of the asbestos slurry than that indicated may be desired and the dilution, fineness of asbestos subdivision and the dispersion thereof may be varied, as will be apparent to those skilled in the art, to suit the particular chosen mode of utilization of the consociated asbestos and rubber. The stability of the dispersion of consociated asbestos and rubber may be lowered by violent mechanical agitation and this should be avoided, as stated, but there seems to be no lowering of stability on standing, i. e. an aggregating tendency may be mechanically induced but no such coagulative aggregating tendency is statically induced by the asbestos either in electropositive colloidal rubber dispersions or in dispersions of consociated asbestos and rubber derived from such dispersions.

The term "asbestos" as herein used is intended to include all naturally occurring asbestiform crystals generally as distinguished from such inorganic fibrous materials as mineral wool, rock wool, spun glass, glass wool, blown slag, etc. which not only have no specific coagulative effect on ordinary latex or aqueous dispersions of negatively charged colloidal rubber particles but are not capable of spontaneous consociation with positively charged colloidal rubber particles when contacted therewith in an aqueous dispersion thereof.

It should be understood that the present disclosure is for the purpose of illustration only and that this invention includes all modifications and equivalents which fall within the scope of the appended claims.

I claim:

1. Method of effecting consociative attachment of asbestos in aqueous suspension and rubber particles which comprises contacting asbestos with an aqueous dispersion of electropositive colloidal rubber particles.

2. Method of effecting consociative attachment of rubber particles of colloidal dimension and asbestos dispersed in a watery medium which comprises contacting asbestos with an aqueous dispersion of electropositive colloidal rubber particles in the presence of an agent dispersive of said asbestos.

3. Method of treating asbestos which comprises converting an electronegative rubber dispersion to an electropositive dispersion by means of a polyvalent metal salt of a monobasic acid and thereafter mixing the electropositive dispersion with asbestos in aqueous suspension whereby spontaneous deposition of the rubber particles on the asbestos surfaces is effected.

4. Method of treating asbestos which comprises converting an electronegative rubber dispersion to an electropositive dispersion by means of aluminum chloride and thereafter mixing the electropositive dispersion with asbestos in aqueous suspension whereby spontaneous deposition of the rubber particles on the asbestos surfaces is effected.

5. Method of treating asbestos which comprises mixing asbestos in aqueous suspension in the presence of an agent dispersive of the asbestos with electropositive rubber particles whereby spontaneous deposition of the rubber particles on the asbestos surfaces is effected.

6. Method of treating asbestos which comprises converting an electronegative rubber dispersion to an electropositive dispersion in the presence of added amphoteric protein and by means of hydrogen ions and thereafter mixing the electropositive dispersion with asbestos in aqueous suspension whereby spontaneous deposition of the rubber particles on the asbestos surfaces is effected.

7. Method of making asbestos-rubber products which comprises mixing asbestos in aqueous suspension with electropositive rubber particles whereby spontaneous deposition of the rubber particles on the asbestos surfaces is effected and subsequently forming a sheet from the resulting rubberized asbestos slurry.

8. Method of making asbestos-rubber products which comprises converting an electronegative rubber dispersion to an electropositive dispersion by means of a polyvalent metal salt of a monobasic acid, thereafter mixing the resulting electropositive dispersion with asbestos in aqueous suspension whereby spontaneous deposition of the rubber particles on the asbestos surfaces is effected, and subsequently forming a sheet from the resulting rubberized asbestos slurry.

9. Method of making asbestos-rubber products which comprises mixing asbestos in aqueous suspension in the presence of an agent dispersive of the asbestos with electropositive rubber particles whereby spontaneous deposition of the rubber particles on the asbestos surfaces is effected and subsequently forming a sheet from the resulting rubberized asbestos slurry.

10. Method of making asbestos-rubber products which comprises converting an electronegative rubber dispersion to an electropositive dispersion in the presence of added amphoteric protein and by means of hydrogen ions, thereafter mixing the electropositive dispersion with asbestos in aqueous suspension whereby spontaneous deposition of the rubber particles on the asbestos surfaces is effected, and subsequently forming a sheet from the resulting rubberized asbestos slurry.

GEORGE R. TUCKER.